(12) United States Patent
Schroeder et al.

(10) Patent No.: US 6,910,322 B2
(45) Date of Patent: Jun. 28, 2005

(54) GRASS CATCHER ATTACHMENT METHOD AND APPARATUS

(75) Inventors: Paul A. Schroeder, Manitowoc, WI (US); Kari Ann Kalista, Kiel, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/447,100

(22) Filed: May 28, 2003

(65) Prior Publication Data

US 2004/0237493 A1 Dec. 2, 2004

(51) Int. Cl.⁷ .............................................. A01D 43/06
(52) U.S. Cl. ..................................................... 56/202
(58) Field of Search ................................ 56/16.6, 17.4, 56/202, 203, DIG. 9

(56) References Cited

U.S. PATENT DOCUMENTS

| | | | | |
|---|---|---|---|---|
| 3,553,947 A | | 1/1971 | Root | 56/202 |
| 3,726,069 A | * | 4/1973 | Cope | 56/202 |
| 3,797,214 A | | 3/1974 | Erdman et al. | 56/320.2 |
| 3,805,499 A | | 4/1974 | Woelffer et al. | 56/202 |
| 3,820,313 A | * | 6/1974 | Hoffmann | 56/202 |
| 4,149,363 A | | 4/1979 | Woelffer et al. | 56/202 |
| 4,158,279 A | * | 6/1979 | Jackson | 56/202 |
| 4,251,982 A | * | 2/1981 | Skaja et al. | 56/202 |
| 4,306,408 A | | 12/1981 | Christopherson et al. | 56/202 |
| 4,312,176 A | | 1/1982 | Bollinger et al. | 56/202 |
| 4,735,037 A | * | 4/1988 | Benter | 56/13.3 |
| 4,761,943 A | * | 8/1988 | Parker et al. | 56/202 |
| 4,800,712 A | | 1/1989 | Morse et al. | 56/202 |
| 5,457,946 A | | 10/1995 | Deitrick | 56/16.6 |
| 6,006,506 A | | 12/1999 | Dawson | 56/320.2 |
| 6,044,634 A | | 4/2000 | Velke et al. | 56/16.6 |
| 6,155,034 A | | 12/2000 | Velke et al. | 56/16.6 |
| 6,182,429 B1 | | 2/2001 | Velke et al. | 56/16.7 |
| 6,301,865 B1 | | 10/2001 | Velke et al. | 56/16.7 |
| 6,415,587 B1 | | 7/2002 | Velke et al. | 56/16.6 |
| 2002/0026779 A1 | | 3/2002 | Velke et al. | 56/320.2 |

* cited by examiner

Primary Examiner—Robert E. Pezzuto
Assistant Examiner—Nathan S Mammen
(74) Attorney, Agent, or Firm—Micheal Best & Friedrich LLP

(57) ABSTRACT

A lawnmower comprising a mower deck having a discharge outlet for discharging grass clippings. The mower deck includes an aperture and slot defined by the mower deck adjacent opposite sides of the discharge outlet. A chute is pivotally connected to the mower deck above the discharge outlet and may pivot between a stowed condition and an operable condition. An extension portion is removably connectable to the mower deck adjacent the discharge outlet. The extension portion includes a fixed pin engageable with the aperture and a latch engageable with the slot. The latch is movable between an engaged position, in which the latch engages the slot, and a disengaged position, in which the latch is removed from the slot. The extension portion extends beyond the chute while the chute is in the stowed condition. A grass catcher is connectable to extension portion opposite the mower deck.

16 Claims, 7 Drawing Sheets

US 6,910,322 B2

GRASS CATCHER ATTACHMENT METHOD AND APPARATUS

FIELD OF THE INVENTION

This invention relates to a lawnmower, and more particularly to a grass catcher attachment method and apparatus for a lawnmower.

BACKGROUND OF THE INVENTION

Lawnmowers generally include a mower deck and a cutting blade disposed below the mower deck to cut grass, or other vegetation. The grass clippings are commonly mulched below the mower deck, discharged from the mower deck to the ground adjacent the lawnmower, or collected within a grass catcher. In some prior art lawnmowers, the grass catcher may be connected directly to the mower deck.

SUMMARY OF THE INVENTION

The present invention provides a lawnmower comprising a mower deck at least partially enclosing a cutting blade that may cut vegetation, such as grass. As the cutting blade cuts grass, grass clippings generally circulate below the mower deck. The mower deck includes a discharge outlet for discharging grass clippings from the mower deck. The lawnmower comprises an aperture and a slot defined by the mower deck and positioned adjacent opposite sides of the discharge outlet.

A chute is pivotally connected to the mower deck above the discharge outlet and may pivot between a stowed condition, in which the chute is pivoted up away from the discharge outlet, and an operable condition, in which the chute extends outwardly from the mower deck beyond the discharge outlet to direct the grass clippings being discharged in a selected direction.

An extension portion is removably connectable to the mower deck adjacent the discharge outlet. The extension portion includes a top panel, a fixed pin connected to the top panel and engageable with the aperture, and a latch connected to the top panel and engageable with the slot. In some constructions, the latch may include a retainer and a mounting pin rotationally received within the retainer. The mounting pin is be generally L-shaped and includes a base end disposed within the retainer and a latch end extending outwardly from the retainer. The mounting pin is rotatable within the retainer between an engaged position, in which the latch end engages the slot, and a disengaged position, in which the latch end is removed from the slot.

The extension portion comprises an extension inlet and an extension outlet disposed at opposite ends of the extension portion. The extension inlet of the extension portion is connectable to the mower deck, and the extension portion extends beyond the chute while the chute is in the stowed condition. A grass catcher is connectable to the extension outlet end of the extension portion.

Other features and advantages of the present invention will become apparent to those skilled in the art upon review of the following detailed description and drawings.

Figure 1:
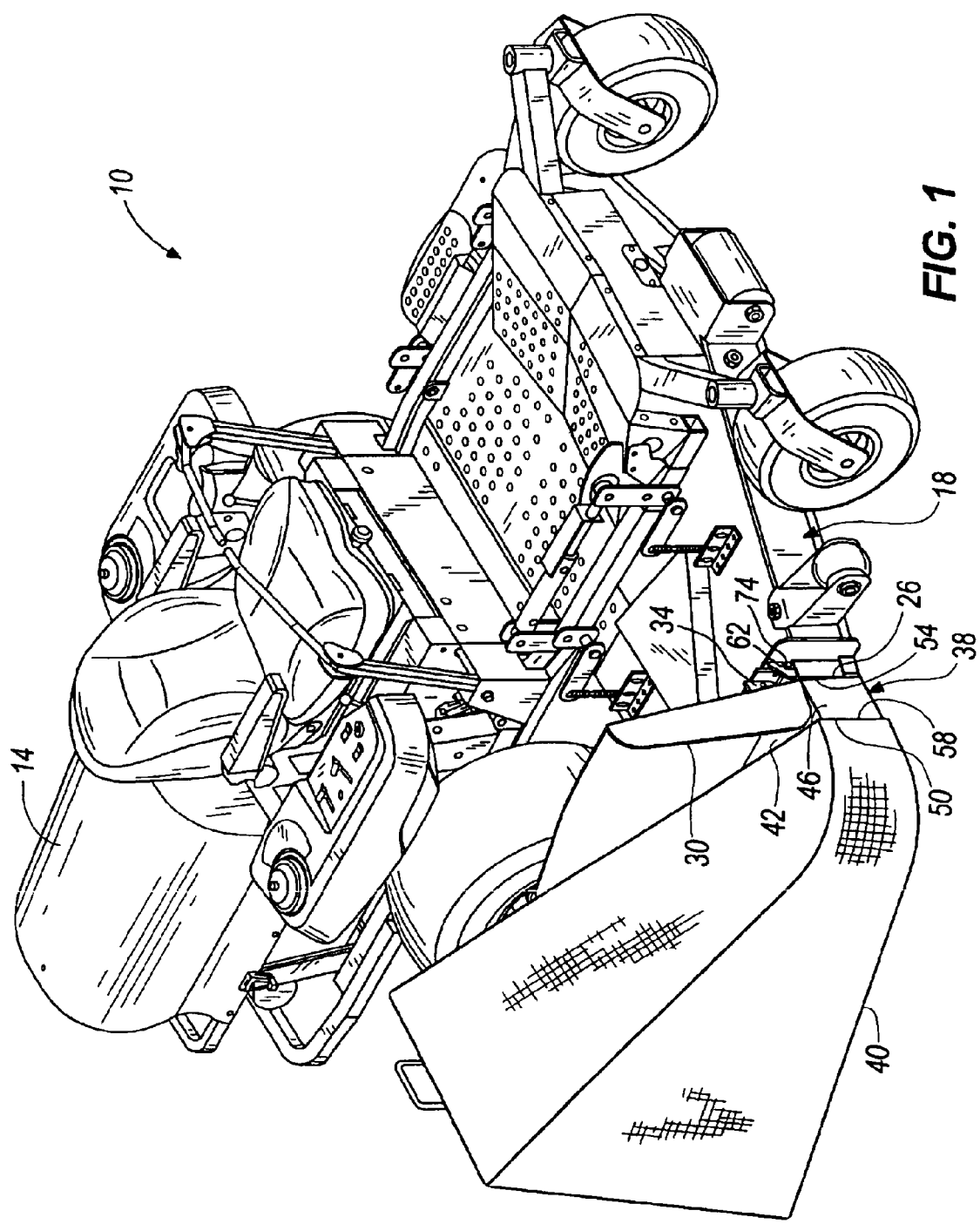
FIG. 1 is a perspective view of a lawnmower having an extension portion and a grass catcher embodying aspects of the invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 8:
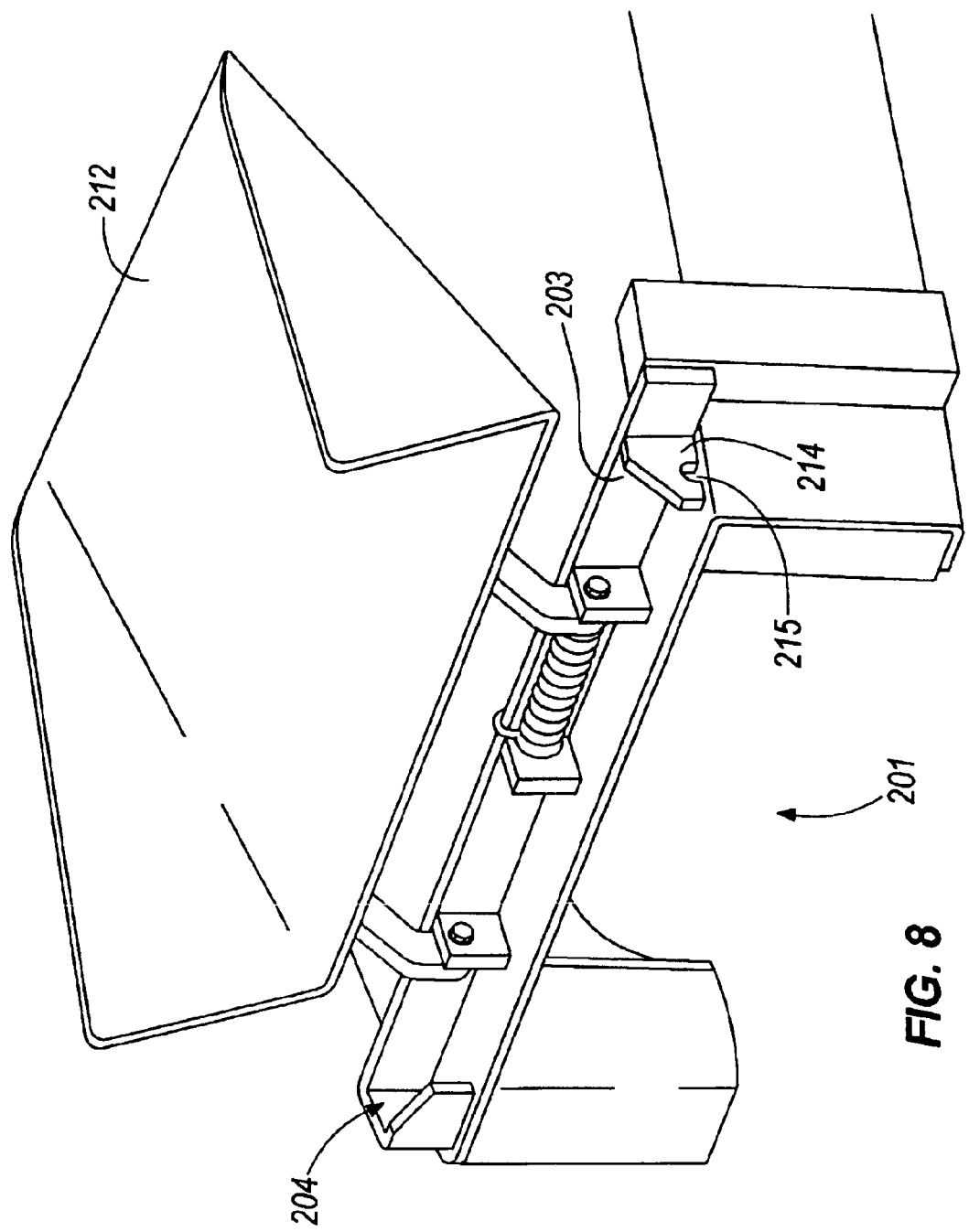
FIG. 8 is a prior art grass catcher assembly.

The present invention includes an adapter for the grass catcher attachment assembly disclosed in U.S. Pat. No. 6,301,865, the entire contents of which are incorporated herein by reference. With reference to FIG. 8, the prior art assembly includes a mower deck having a grass-throwing opening 201. The mower deck also includes a support bar member 203 adjacent the opening 201 for stiffening and providing support for the opening 201. The support bar 203 includes a rear slot portion 204 bent from bar 203. The assembly includes a grass chute deflector 212 pivotally connected to the mower deck. Front support tab 214 is connected to support bar 203 and includes a notch or aperture 215 defined therein for receiving a first pin rigidly mounted to the front of a grass catcher. The slot portion 204 receives a second pin rigidly mounted to the front of the grass catcher. The second pin may simply drop into the slot 204 when the catcher is pivotally connected to the mower deck and the first pin is received in the aperture 215.

The chute 212 is pivotable through a range of motion sufficient to expose the front support tab 214 and rear slot 204 from above so that the first pin can be slid into the aperture 215 and so that there is clearance to lower the second pin into the slot 204 from above.

FIG. 1 illustrates a riding lawnmower 10 having an engine 14 and a mower deck 18 embodying aspects of the invention. The lawnmower 10 includes one or more cutting blades 22 (FIGS. 2–3) disposed below the mower deck 18 and rotationally driven by the engine 14. The lawnmower 10 generally rotates the cutting blades 22 (FIGS. 2–3) to cut grass, or other vegetation, and generates an airflow that circulates grass clippings below the mower deck 18. The mower deck 18 includes a discharge outlet 26 for discharging grass clippings from the mower deck 18.

The lawnmower 10 includes a chute 30 connected to the mower deck 18 adjacent the discharge outlet 26 that directs grass clippings away from the lawnmower 10. The chute 30 is pivotally connected to the mower deck 18 to pivot about a pivot axis 34 between an operable or lowered condition, in which the chute 30 extends outwardly from the mower deck 18, and a stowed or raised condition, in which the chute 30 extends upwardly from the mower deck 18, as shown in FIG. 1. The chute 30 is pivotable only to a substantially vertical orientation and therefore has a limited range of motion with respect to the prior art chute. Consequently, the front support tab and rear slot are not exposed from above and the chute 30 does not provide the clearance from above required by the prior art assembly described above.

To overcome the lack of clearance for the grass catcher, the lawnmower 10 includes an extension portion 38 removably connected to the mower deck 18 adjacent the discharge outlet 26 when the chute 30 is in the raised position. The extension portion 38 provides clearance beyond the chute 30 to connect a grass catcher 40 to the extension portion 38.

The extension portion 38 comprises a top panel 42 and two side panels 46 extending downwardly from opposite sides of the top panel 42. The top panel 42 and side panels 46 at least partially define an extension passage 50 having an extension inlet 54 and an extension outlet 58. The extension inlet 54 is disposed at an end of the extension portion 38 adjacent the discharge outlet 26 when the extension portion 38 is connected to the mower deck 18. The extension outlet 58 is disposed at an end of the extension portion 38 opposite the extension inlet 54. The extension inlet 54 receives grass clippings from the discharge outlet 26 into the extension passage 50. The grass catcher 40 is connected to the extension portion 38 adjacent the extension outlet 58, and grass clippings are discharged from the extension passage 50 through the extension outlet 58 and into the grass catcher 40.

Figure 2:
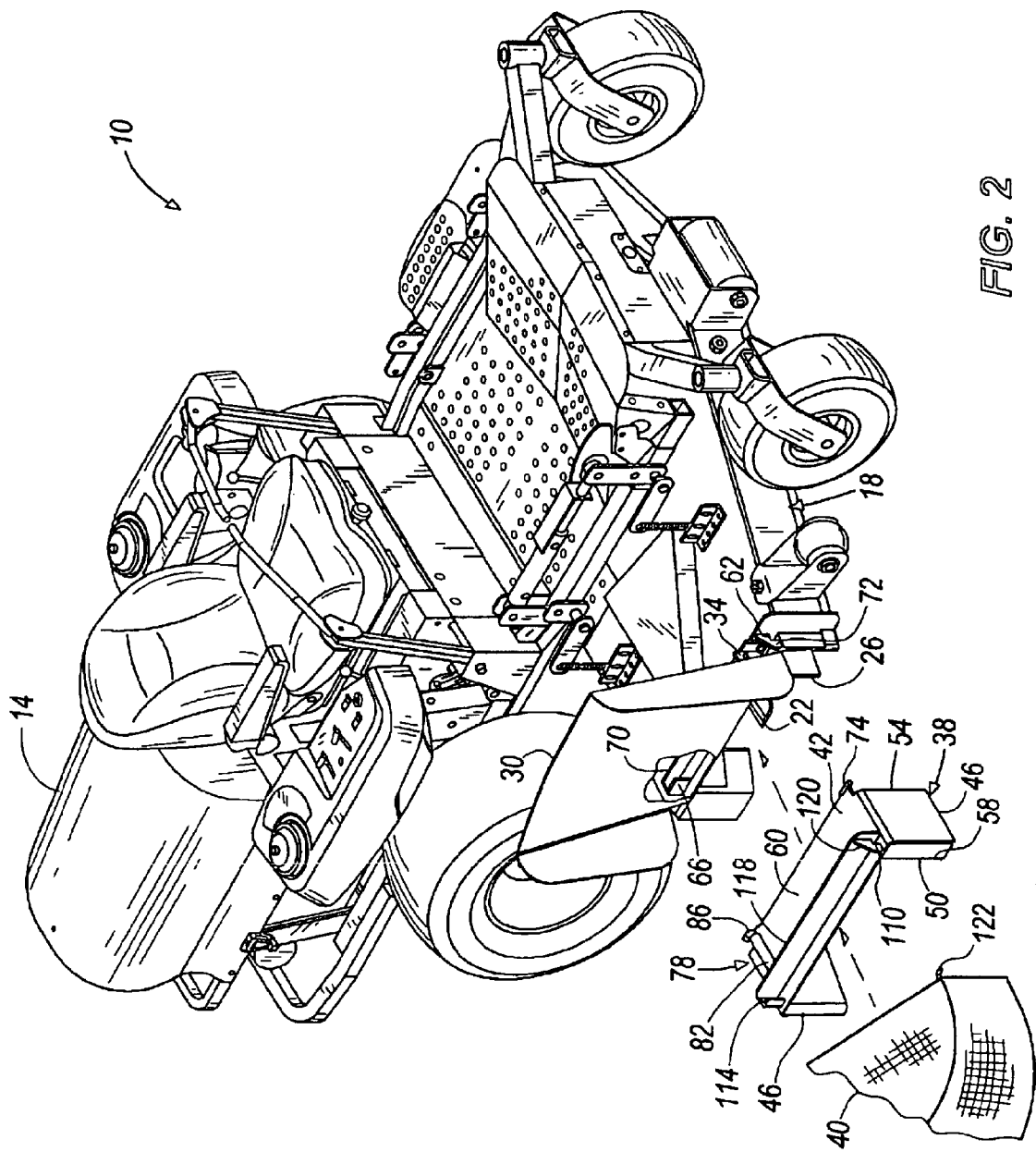
FIG. 2 is an assembly view of the lawnmower of FIG. 1.
Figure 3:
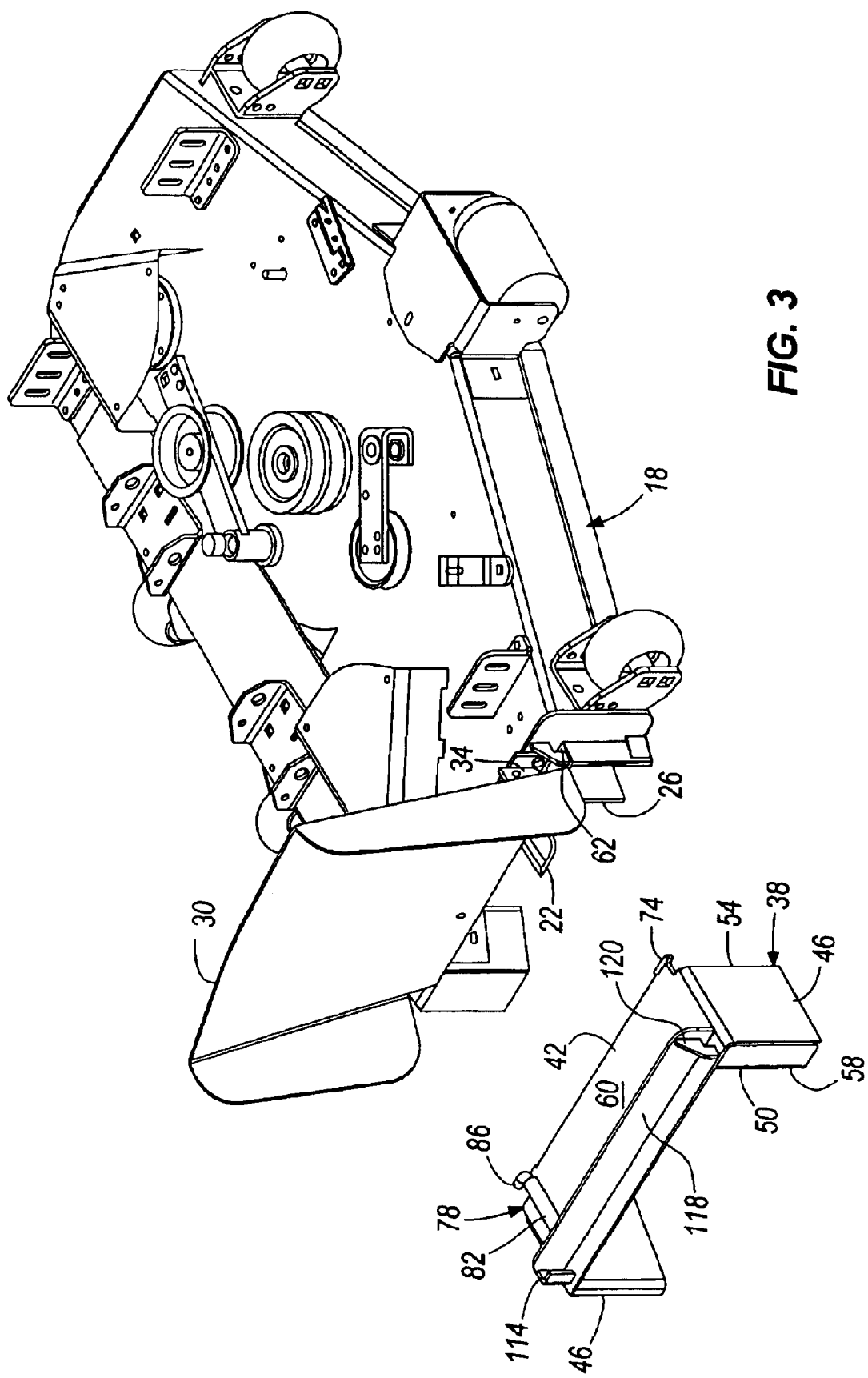
FIG. 3 is a perspective view of a portion of the lawnmower of FIG. 1.

FIG. 2 illustrates the mower deck 18, the extension portion 38, and the grass catcher 40 separated from one another. The top panel 42 of the extension portion 38 defines a top plane 60. The extension portion 38 includes a first connection means for removably and pivotally connecting the extension portion 38 to the mower deck 18, and a second connection means for releasably connecting the extension portion 38 to the mower deck 18 when the first connection means is connected. The first and second connection means are disposed near opposite sides of the discharge opening. The extension portion 38 pivots about the first connection means with respect to the mower deck 18.

The mower deck 18 includes an aperture 62 and a slot 66 disposed above the discharge outlet 26 near opposite sides of the discharge outlet 26. In FIG. 2, a portion of the chute 30 is cut-away to illustrate the slot 66. A flange 70 extends from the mower deck 18 above the discharge outlet 26 and defines the aperture 62 and slot 66. The flange 70 includes a support tab 72 defining the aperture 62.

The extension portion 38 includes a fixed pin 74 connected to the top panel 42 near a side of the extension inlet 54. The fixed pin 74 is engageable with the aperture 62 such that the extension portion 38 is pivotal relative to the aperture 62 in a direction substantially parallel to the top plane 42 when the fixed pin 74 engages the aperture 62. The extension portion 38 also includes a latch 78 connected to the top panel 42 near a side of the extension inlet 54 opposite the fixed pin 74. The latch 78 is movable between an engaged position, in which the latch 78 engages the slot 66, and a disengaged position, in which the latch 78 is disengaged from the slot 66.

Figure 4:
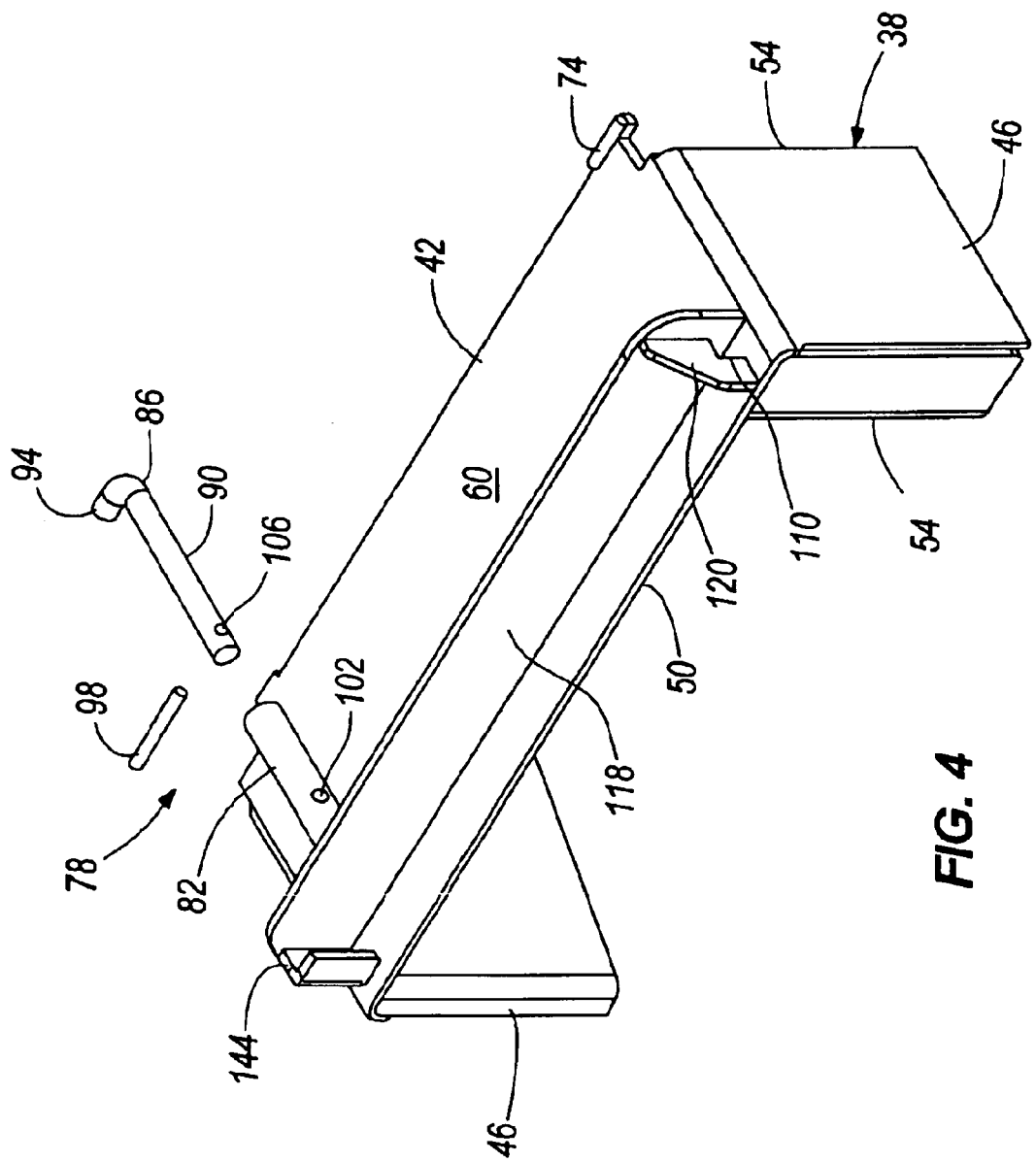
FIG. 4 is an enlarged perspective view of the extension portion of FIG. 1.

In the illustrated construction, the latch 78 includes a retainer 82 connected to the top panel 42 and a mounting pin 86 at least partially disposed within the retainer 82 and movable with respect to the retainer 82. The retainer 82 has a cylindrical tube shape and extends in a direction from the extension outlet 58 toward the extension inlet 54. The mounting pin 86 extends from an end of the retainer 82 near the extension inlet 54. As shown in FIG. 4, the mounting pin 86 includes a generally L-shaped pin having a base end 90 rotationally received within the retainer 82 and a latch end 94 extending outwardly from the retainer 82.

Figure 5:
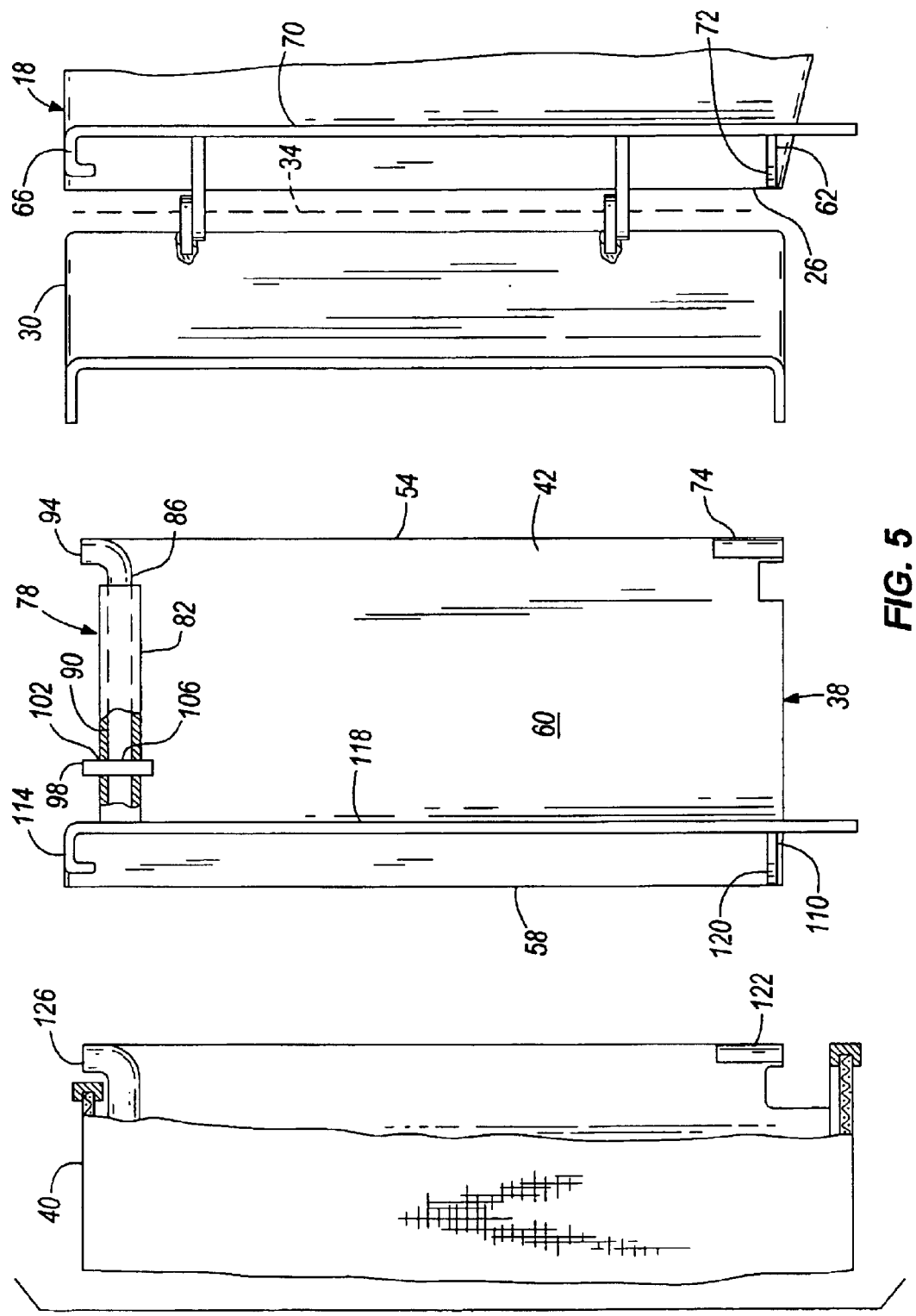
FIG. 5 is a top view of a portion of the lawnmower of FIG. 1.
Figure 6:
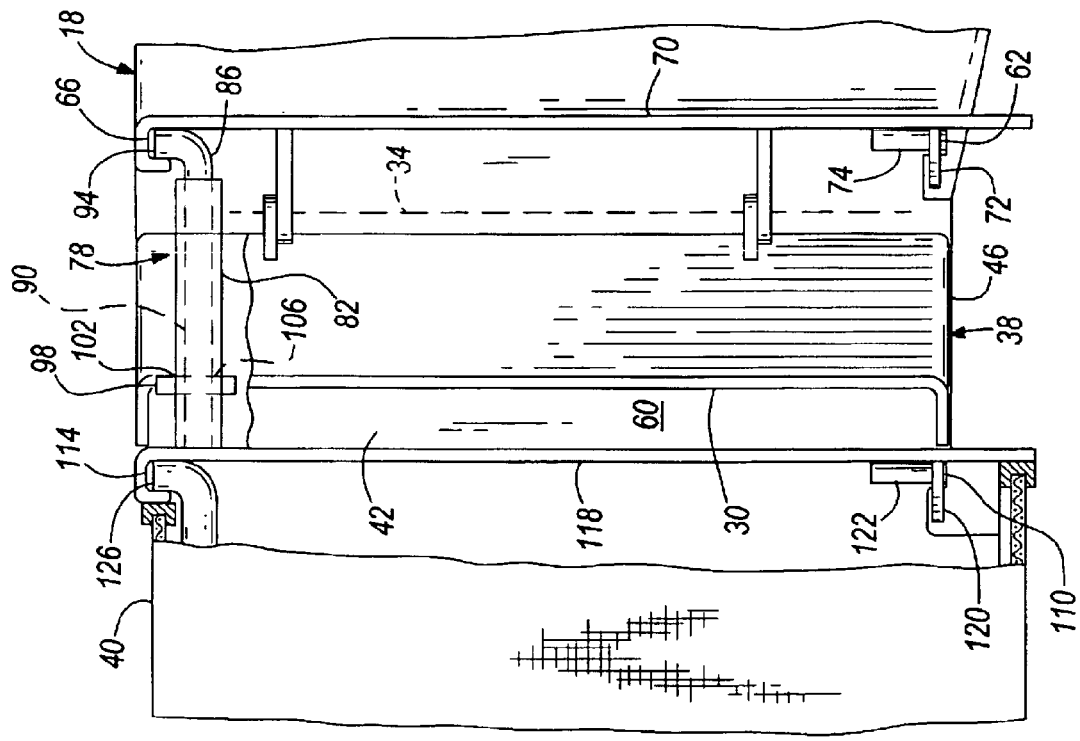
FIG. 6 is a top view of a portion of the lawnmower of FIG. 1.

As shown in FIGS. 4–6, the base end 90 is relatively longer than the latch end 94. The mounting pin 86 is rotatable with respect to the retainer 82 between the engaged position, in which the latch end 94 extends into the slot 66, and the disengaged position, in which the latch end 94 is removed from the slot 66. When the mounting pin 86 is in the engaged position, the latch end 94 extends in a generally horizontal direction away from the fixed pin 74 (as shown in FIG. 6). When the mounting pin 86 is in the disengaged position, the latch end 94 may extend in a generally vertical direction, away from the extension inlet 54, or may be rotated further toward a generally horizontal direction extending toward the fixed pin 74.

In the illustrated construction, the latch 78 includes a lock that selectively resists movement of the latch 78 away from the engaged position. The lock includes a lock pin 98, a lock opening 102 in the retainer 82, and a lock passage 106 extending through the base end 90 of the mounting pin 86. The lock passage 106 is aligned with the lock opening 102 when the mounting pin 86 is in the engaged position, and the lock pin 98 may be inserted through the lock opening 102 and lock passage 106 to restrict movement of the mounting pin 86 with respect to the retainer 82. The lock pin 98 may include a securing mechanism, such as a tab, cotter pin, interference fit or other similar securing mechanism, to maintain the lock pin 98 in position and resist movement of the lock pin 98 out of the lock passage 106 and lock opening 102. The lock pin 98 may be selectively removed from the lock passage 106 and lock opening 102 to permit movement of the mounting pin 86 from the engaged position toward the disengaged position.

In FIG. 2, the first connection means includes the aperture 62 and the fixed pin 74 releasably and pivotally connecting a first side of the extension portion 38 to the mower deck 18. The second connection means includes the latch 78 and slot 66 releasably connecting the opposite side of the extension portion 38 to the mower deck 18. The latch 78 engages the slot 66 when the fixed pin 74 engages the aperture 62. In other aspects and in other constructions, the second connection means may include other latches, such as latches pivoting about a point, linearly sliding pins, or other similar latches.

As mentioned above, the extension portion 38 extends beyond the chute 30 to provide sufficient clearance to connect the grass catcher 40 to the mower deck 18. The grass catcher 40 generally engages the slot 66 from a vertical direction, but the chute 30 may not pivot far enough to provide vertical access to the slot 66. Therefore, the extension portion 38 engages the mower deck 18 and slot 66 from a generally horizontal direction, and extends beyond the chute 30 to provide clearance for the grass catcher 40 to engage the extension portion 38 from a generally vertical direction.

As shown in FIG. 2, the grass catcher 40 is removably connectable to the extension portion 38 near the extension outlet 58. Therefore, the mower deck 18 and grass catcher 40 are connected to opposite ends of the extension portion 38. The extension portion 38 includes an extension aperture 110 and an extension slot 114 disposed above the extension outlet 58 near opposite sides of the extension outlet 58. An extension flange 118 extends upwardly from the mower deck 18 above the extension outlet 58 and defines the extension aperture 62 and extension slot 66. The extension flange 118 includes an extension support tab 120 that defines the aperture 62. The extension aperture 110 and extension slot 114 of the extension portion 38 are constructed similarly to the aperture 62 and slot 66 of the mower deck 18.

FIG. 5 illustrates a top view of the mower deck 18, extension portion 38, and grass catcher 40. As shown in FIG. 5, the grass catcher 40 includes a first pin 122 and a second pin 126 on opposite sides of the grass catcher 40. Both the first and second pins 122, 126 are fixed relative to the grass catcher 40 and generally extend outwardly from the grass catcher 40 in opposite directions from each other. The first and second pins 122, 126 are engageable with the extension aperture 110 and the extension slot 114, respectively, to connect the grass catcher 40 to the extension portion 38. Generally, the first pin 122 may be inserted into the extension aperture 110, and the grass catcher 40 may then be pivoted to insert the second pin 126 into the extension slot 114 from a vertical direction. Since the second pin 126 is fixed and extends outwardly, the extension slot 114 prevents the second pin 126 from being inserted into, or being removed from, the extension slot 114 in a generally horizontal direction. The extension slot 114 generally faces inwardly, and the distance between the outer ends of the first and second pins 122, 126 is greater than the distance from the extension aperture 110 to the inner end of the extension slot 114.

Figure 7:
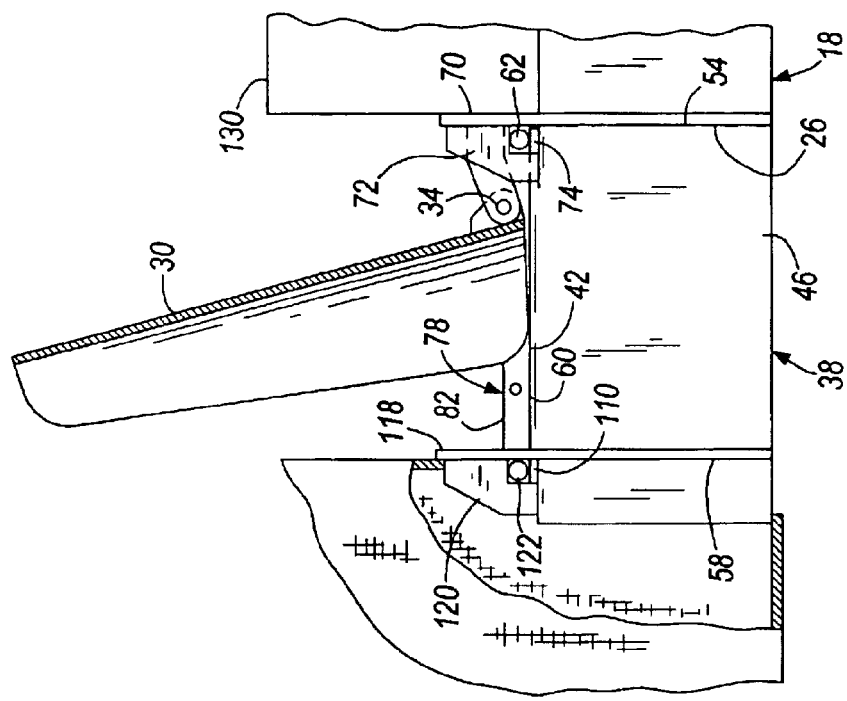
FIG. 7 is a side view of a portion of the lawnmower of FIG. 1.

As shown in FIG. 7, the extension portion 38 is connected between the mower deck 18 and the grass catcher 40. The fixed pin 74 extends through the aperture 62, and the first pin 122 extends through extension aperture 110. The chute 30 is pivoted upwardly about the pivot axis 34 to provide clearance for the extension portion 38. The mower deck 18 may include a stop 130 that restricts pivotal movement of the chute 30. In the illustrated construction, a mounting bracket for the chute 30 extends beyond the aperture 62, and the aperture 62 is disposed between the discharge outlet 26 and the pivot axis 34. As mentioned above, the chute 30 extends above the aperture 62 and slot 66 (FIG. 6) and obstructs access to the aperture 62 and slot 66 (FIG. 6) from a vertical direction. The chute 30 is pivotally biased downwardly and contacts the top panel 42 when the extension portion 38 is connected to the mower deck 18.

In operation, to connect the extension portion 38 to the mower deck 18, the chute 30 is pivoted upwardly toward the raised position to expose the discharge outlet 26, as shown in FIG. 2. The mounting pin 86 is rotated toward the disengaged position, and the fixed pin 74 is inserted into the aperture 62. The extension portion 38 is pivoted with respect to the mower deck 18 in a direction substantially parallel to the top plane 60. As the extension portion 38 is pivoted, the latch 78 approaches the slot 66 from a generally horizontal direction until the latch end 94 is aligned with the slot 66. The top panel 42 remains below the chute 30. When the latch end 94 is aligned with the slot 66, the mounting pin 86 may be rotated toward the engaged position to insert the latch end 94 into the slot 66 and engage the latch 78 with the mower deck 18.

As shown in FIG. 6, the lock opening 102 is aligned with the lock passage 106 when the latch 78 is in the engaged position. The lock pin 98 is inserted through lock opening 102 and lock passage 106 to resist movement of the mounting pin 86 with respect to the retainer 82. With the lock pin 98 in place, the latch 78 resists disengaging the slot 66, and the grass catcher 40 may be connected to the extension portion 38. The first pin 122 of the grass catcher 40 is inserted into the extension aperture 110, and the grass catcher 40 may be pivoted with respect to the extension portion 38. The grass catcher 40 is pivoted such that the second pin 126 is positioned above the extension slot 114. The grass catcher 40 is then pivoted downwardly and the second pin 126 is inserted into the extension slot 114 from a generally vertical direction. The second pin 126 engages the extension slot 114 to connect the grass catcher 40 to the extension portion 38. In the previously described method, the order of the acts may not be critical. For example, the grass catcher 40 could be connected to the extension portion 38 before the extension portion 38 is connected to the mower deck 18.

To remove the grass catcher 40 and extension portion 38, the grass catcher 40 is pivoted upwardly with respect to the extension portion 38 to remove the second pin 126 from the extension slot 114. The first pin 122 is removed from the extension aperture 110. The lock pin 98 is removed from the lock passage 106 and lock opening 102, and the mounting pin 86 is rotated from the engaged position toward the disengaged position to remove the latch end 94 from the slot 66. The extension portion 38 is pivoted away from the mower deck 18 in a direction substantially parallel to the top plane 60, or in a generally horizontal direction. The fixed pin 74 is removed from the aperture 62 and the chute 30 is pivoted downwardly toward the lowered position.

In the illustrated construction, the lawnmower 10 includes a riding lawnmower. In other constructions, the lawnmower 10 could also include a walk-behind lawnmower.

In the illustrated construction, the extension portion 38 is separate from the grass catcher 40. In other constructions, the extension portion 38 could be integral with the grass catcher 40.

The foregoing detailed description describes only a few of the many forms that the present invention can take, and should therefore be taken as illustrative rather than limiting. It is only the claims, including all equivalents that are intended to define the scope of the invention.

What is claimed is:

1. A method for connecting an extension portion to a lawnmower, the method comprising the acts of:

providing the lawnmower including a mower deck having a discharge outlet, a chute pivotally connected to the mower deck adjacent the discharge outlet, and an aperture and a slot positioned near opposite sides of the discharge outlet;

providing the extension portion having a top panel defining a top plane, and a fixed pin and a latch connected to the top panel near opposite sides of the top panel, the latch being moveably connected to the top panel and being movable between an engaged position and a disengaged position;

pivoting the chute upwardly with respect to the mower deck;

inserting the fixed pin into the aperture;

pivoting the extension portion with respect to the mower deck in a direction substantially parallel to the top plane to align the latch with the slot; and moving the latch from the disengaged position to the engaged position to engage the latch with the slot.

2. The method of claim 1, wherein the act of pivoting the extension portion comprises keeping the top panel below the chute.

3. The method of claim 1, wherein the latch further comprises a retainer connected to the top panel and a mounting pin rotatably received in the retainer, the mounting pin including a latch end extending outwardly from the retainer, and wherein the act of moving the latch further comprises:

rotating the mounting pin relative to the top panel from the disengaged position, in which the latch end is not received in the slot, to the engaged position, in which the latch end is received in the slot.

4. The method of claim 3, wherein the latch further comprises a lock pin, a lock opening in the retainer, and a lock passage extending through the mounting pin and aligned with the lock opening when the latch is in the engaged position, the method further comprising the act of:

after moving the latch to the engaged position, inserting the lock pin through the lock opening and the lock passage; and resisting rotation of the mounting pin out of the engaged position with the lock pin.

5. The method of claim 3, wherein the mounting pin is generally L-shaped and has a first leg rotatably received in the retainer and a second leg defining the latch end.

6. The method of claim 1, further comprising the acts of:

providing a grass catcher; and connecting a grass catcher to the extension portion.

7. A lawnmower comprising:
a mower deck at least partially enclosing a cutting blade and having a discharge outlet for discharging grass clippings from the mower deck;
an aperture and a slot defined by the mower deck and positioned adjacent opposite sides of the discharge outlet;
a chute connected to the mower deck above the discharge outlet and pivotal between a stowed condition, in which the chute is pivoted up away from the discharge outlet, and an operable condition, in which the chute extends outwardly from the mower deck beyond the discharge outlet to direct the grass clippings being discharged in a selected direction;
a stop restricting pivotal movement of the chute such that at least part of the chute is disposed above the aperture and slot when the chute contacts the stop; and
an extension portion removably connectable to the mower deck adjacent the discharge outlet, the extension portion including:
a top panel;
a fixed pin connected to the top panel and engageable with the aperture;
a retainer connected to the top panel and being generally tubular shaped;
a mounting pin being generally L-shaped and including a base end rotationally received within the retainer and a latch end, the mounting pin being rotatable within the retainer between an engaged position and a disengaged position, the latch end being engageable with the slot when the mounting pin is in the engaged position.

8. The lawnmower of claim 7, wherein the extension portion comprises two side panels extending downwardly from opposite sides of the top panel, the top and side panels at least partially defining an extension passage, an extension inlet, and an extension outlet, the extension inlet being disposed at an end of the extension portion adjacent the discharge outlet when the extension portion is connected to the mower deck for receiving grass clippings from the discharge outlet, and the extension outlet disposed at an end of the extension portion opposite the extension inlet for discharging grass clippings from the extension portion.

9. The lawnmower of claim 8, wherein the extension portion includes an extension aperture and an extension slot disposed above the extension outlet adjacent opposite sides of the top panel.

10. The lawnmower of claim 9, further comprising a grass catcher removably connectable to the extension portion for receiving grass clippings from the extension portion, the grass catcher being engageable with the extension aperture and the extension slot.

11. The lawnmower of claim 7, wherein the extension portion comprises a lock pin, a lock opening in the retainer, and a lock passage extending through the mounting pin, the lock passage being aligned with the lock opening when the mounting pin is in the engaged position, and the lock pin being insertable through the lock opening and lock passage to restrict movement of the mounting pin relative to the retainer.

12. A lawnmower comprising:
a mower deck at least partially enclosing a cutting blade, the mower deck including a discharge outlet for discharging grass clippings from the mower deck;
a chute pivotally connected to the mower deck adjacent the discharge outlet to pivot about a pivot axis disposed adjacent the slot and aperture, the chute extending outwardly from the mower deck beyond the discharge outlet and pivotal to a stowed position;
an extension portion removably connectable to the mower deck adjacent the discharge outlet, the extension portion including:
a top panel defining a top plane;
a first connection means for pivotally connecting the extension portion to the mower deck, the extension portion being pivotal about the first connection means with respect to the mower deck in a direction substantially parallel to the top plane;
a second connection means for releasably engaging the extension portion to the mower deck, at least a portion of said second connection means attached to the top panel and movable with respect to the top panel between an engaged position and a disengaged position, the first and second connection means being disposed adjacent opposite sides of the discharge outlet; and
a grass catcher removably connectable to the extension portion.

13. The lawnmower of claim 12, wherein the first connection means comprises an aperture defined by the mower deck near the discharge outlet, and a fixed pin connected to the top panel and engageable with the aperture.

14. The lawnmower of claim 12, wherein the second connection means comprises:
a slot defined by the mower deck near the discharge outlet;
a retainer connected to the top panel and having generally tubular shape;
a mounting pin being generally L-shaped and including a base end rotationally received within the retainer and a latch end extending outwardly from the retainer, the mounting pin being rotatable within the retainer between an engaged position, in which the mounting pin is engaged with the slot, and a disengaged position, in which the mounting pin is disengaged from the slot, the latch end being insertable into the slot when the mounting pin is in the engaged position.

15. The lawnmower of claim 14, further comprising a locking means for resisting movement of the second connection means from the engaged position to the disengaged position.

16. The lawnmower of claim 15, wherein the locking means comprises a lock opening in the retainer, and a lock passage extending through the mounting pin, the lock passage being aligned with the lock opening when the mounting pin is in the engaged position, and a lock pin being insertable through the lock opening and lock passage to restrict movement of the mounting pin relative to the retainer.

* * * * *

UNITED STATES PATENT AND TRADEMARK OFFICE
CERTIFICATE OF CORRECTION

PATENT NO.    : 6,910,322 B2
DATED         : June 28, 2005
INVENTOR(S)   : Paul A. Schroeder and Kari Ann Kalista It is certified that error appears in the above-identified patent and that said Letters Patent is hereby corrected as shown below:

Title page,
Item [74], *Attorney, Agent, or Firm*, "Micheal Best & Friedrich LLP" should be
-- Michael Best & Friedrich LLP --.

Column 8,
Line 21, "porition" should be -- portion --.

Signed and Sealed this

Fourth Day of October , 2005

JON W. DUDAS
*Director of the United States Patent and Trademark Office*